United States Patent

Fruhalf

[15] 3,688,221

[45] Aug. 29, 1972

[54] TWO-STAGE PCM CODER WITH COMPRESSION CHARACTERISTIC

[72] Inventor: Waldemar Fruhalf, Berlin, Germany

[73] Assignee: Krone GmbH, Berlin-Zehlendorf, Germany

[22] Filed: March 2, 1971

[21] Appl. No.: 120,171

[52] U.S. Cl. .................332/11 R, 178/66, 325/38 B, 340/345

[51] Int. Cl. ...............................................H03k 7/00

[58] Field of Search ..................332/9, 9 T, 11, 11 D; 325/38 R, 38 B, 141; 178/66; 340/347, 345, 348

[56] References Cited

UNITED STATES PATENTS

| | | | |
|---|---|---|---|
| 3,175,212 | 3/1965 | Miller | 325/38 R X |
| 3,403,226 | 9/1968 | Wintringham | 325/38 R X |
| 3,492,432 | 1/1970 | Schimpf | 325/38 R X |
| 3,500,247 | 3/1970 | Sekimoto et al. | 325/38 R X |

*Primary Examiner*—Alfred L. Brody
*Attorney*—Ross, Karl F.

[57] ABSTRACT

Analog signals within an amplitude range of $\pm 2U_{ref}$ ($U_{ref}$ being a fixed reference potential) are classified by a decision network as falling within one of $2^m$ positive or negative amplitude bands progressively increasing in width by a factor of 2, the identity of the band being registered by a precoder generating *m* bits to which is added a further bit indicating the polarity of the signal. An amplitude converter passes each signal to a final coder, with an amplification factor depending upon the particular amplitude band as determined by the decision network. At least a final stage of the amplitude converter works directly into the final coder and includes one or more operational amplifiers each with an additive and a subtractive input, the latter being connected to the amplifier output through a feedback circuit which comprises a voltage divider determining the amplification factor and a source of biasing voltage of magnitude $2U_{ref}$ for generating a zero output at the lower limit of each band. For the lowest band, ranging between O and $U_{ref}/2^{(2\ -2)}$, the biasing voltage is cut off. The amplifier output is digitized in the final coder to yield *n* more bits for a total of $2^{n+m+1}$ discrete amplitude values.

14 Claims, 20 Drawing Figures

Inventor:
Waldemar FRÜHAUF
by Karl F. Ross
Attorney

Patented Aug. 29, 1972

3,688,221

Inventor:
Waldemar FRUHAUF by

Attorney

*Inventor:*
Waldemar FRUHAUF
by

Attorney

Inventor:
Waldemar FRÜHAUF by

Attorney

Inventor:

Waldemar FRUHAUF by

Attorney

*Inventor:*

Waldemar FRÜHAUF by

Attorney

Patented Aug. 29, 1972 3,688,221

11 Sheets-Sheet 7

Inventor:

Waldemar FRÜHAUF by Karl F. Ross
Attorney

Inventor:

Waldemar FRÜHAUF by

Attorney

*Inventor:*
Waldemar FRÜHAUF
by Karl F. Ross
Attorney

Inventor:
Waldemar FRÜHAUF
by
attorney

Inventor:
Waldemar FRÜHAUF
by
Attorney

TWO-STAGE PCM CODER WITH COMPRESSION CHARACTERISTIC

My present invention relates to a pulse-code-modulation system of the compander type and, more particularly, to a pulse-code modulator for such a system having a knee-type compression characteristic to modify the dynamics of a signal voltage to be coded.

Such a compression characteristic consists of $2^{m+1}$ linear segments of progressively diminishing slope dividing a range of signal amplitudes, between limits of $\pm U_{max}$, into $2^{m+1}$ bands (half of them positive, half of them negative) whose width increases from the origin outward by a factor of 2, except for the two innermost bands on either side of the abscissa which are of the same width. With the slope of the segments decreasing in the same binary ratio, the output-voltage increment measured by each segment along the ordinate has the same constant value $\Delta U$.

More particularly, and as discussed hereinafter by way of example, such a characteristic may be divided into 16 segments (eight on each side of the origin) so that $m = 3$. If the four innermost segments of identical slope are considered a single segment, the number of segments reduces to 13. Reference may be made in this connection to a CCITT report entitled COM XV, question No. 33, Temp. Doc. No. 34 of 25 September to 6 October 1967.

Thus, the segments of such a characteristic can be defined by a total of $m+1$ bits, the first bit serving to distinguish between its positive and its negative branches and being therefore necessary only if the signal voltage to be coded can be of either polarity. Within each segment of the characteristic, the amplitude band is further divided into $2^n$ sub-bands represented by $n$ bits so that the sampled signal amplitudes within the range can be digitized by an $(m+1+n)$-bit code for a total of $2^{m+1+n}$ discrete values. Generally, the value of $n$ equals 4.

Thus, such an analog signal can be digitized with the aid of two coding stages, i.e. a precoder generating m bits and a final coder generating $n$ bits, with the polarity bit (if any) produced either by a zero comparator or by the precoder itself. In order to obtain the desired compression characteristic, an amplitude converter is used which introduces an amplification factor and carries out a subtraction depending each upon the absolute magnitude of the analog signal to be coded.

In conventional PCM systems of this general type it is customary to place the amplitude converter ahead of both coding stages whereby the classification of the signal amplitude, as falling within a particular band, must be carried out by the converter itself. For this purpose the converter includes a switching matrix controlled by a decision network which discriminates between the various signal amplitudes to select one of several converter outputs for coding. The decision network, responding to the voltage swing in the converter output, effectively forms with the switching matrix a feedback loop which is incapable of detecting and correcting a wrong classification once made, due to a possible overshot. As a result, coding errors may persist for considerable periods, i.e. until the input signal shifts to a different amplitude band.

The general object of my present invention is to provide an improved pulse-code modulator for the type of system referred to which avoids the aforestated drawbacks.

A more particular object is to obviate the need in such a modulator for so-called floating analog switches (which do not respond to a fixed reference potential) as well as constant-current generators, both of which require complex circuitry in order to be realized with the necessary degree of precision.

It is also an object of my invention to reduce the conventionally required amplification of the input signal which in known systems must provide a maximum of 512 V if the final coder operates in a range of 0 to 4 V. Such high voltages are difficult to realize in switching cycles on the order of 1 $\mu$sec as required for the PCM system of the 30/32-channel type in which only about 4 $\mu$sec are available for the entire coding process, just a fraction of this time being allotted to amplitude conversion.

These difficulties are overcome, in a system embodying my invention, by the provision of a precoder which is controlled by the decision network independently of the amplitude converter, the latter working directly into the final coder while bypassing the precoder. The absolute magnitude of the output voltage generated by the amplitude converter and fed to the final coder rises linearly from zero within each band, thus enabling the final coder to digitize that output voltage without regard to the location of the band in which it originated.

According to a more specific feature of my invention, the converter includes differential circuitry for reducing the magnitude of the input signal by a threshold value representing the lower limit of the respective band. This differential circuitry may comprise a source of biasing voltage for a subtractive (inverting) input terminal of an operational amplifier forming part of the amplitude converter, the same input terminal being connected to a tap on a voltage divider which extends in a feedback circuit from the amplifier output to a point of fixed potential, such as ground. A signal voltage fed to an additive terminal of this operational amplifier is multiplied by an amplification factor which depends on the division ratio of the voltage divider and which therefore may be varied by selectively switching some branches of the voltage divider into and out of circuit.

As will be shown in detail hereinafter, the switching of one of these branches from zero voltage to a biasing voltage of $U_{max}$, upon the input voltage shifting from the lowest band into a higher one, provides for the desired constancy of the slope of the compression characteristic in its first two segments if the resistance of this particular branch equals that of a fixed resistor that forms the part of the voltage divider lying between the output and the inverting input of the operational amplifier.

Instead of switching a resistance network in the feedback circuit of such an operational amplifier, I may provide a plurality of such amplifiers with fixed resistors and biasing connections (where needed) in a parallel array to respond to signal amplitudes within respective bands.

The amplitude converter may also be divided into a first and a second amplification stage, the first stage including a plurality of parallel-connected preamplifiers of different amplification ratios whereas the second stage comprises one or more of the above-described operational amplifiers. Selector switches controlled by the decision network may then be inserted between the two amplification stages for connecting any one of the preamplifiers in tandem with the operational amplifier (or one of the operational amplifiers) of the second stage. A sign-responsive detector, generating the polarity bit, may also be inserted between the two amplification stages or may precede the converter proper; if the converter comprises $2m$ operational amplifiers connected in parallel as mentioned above, such a polarity discriminator may be omitted.

Advantageously, pursuant to another feature of my invention, the amplitude converter and the decision network are fed by an input circuit which samples the incoming analog signal and stores it on a capacitor in the conventional manner but is also provided with an ancillary condenser connection to neutralize variations in the capacitor charge due to switching transients.

The above and other features of my invention will be described in detail hereinafter with reference to the accompanying drawing in which:

FIG. 1*a* is a graph of a compression characteristic of the type used in a pulse-code modulator embodying my invention;

FIG. 1*b* is a graph showing part of the characteristic of FIG. 1*a* on a larger scale together with the corresponding multiplication factors;

FIG. 1*c* is a similar graph showing the multiplication factors in a first converter stage of an embodiment illustrated in FIG. 7;

FIG. 1*d* is a set of graphs showing the digital output of a precoder in the same embodiment;

FIG. 1*e* is a graph showing the analog outputs of a first selector in the embodiment of FIG. 7 prior to rectification by an associated inverter stage;

FIG. 1*f* shows the same analog outputs after rectification;

FIG. 1*g* shows the analog outputs of a second selector cascaded with the first one in the same embodiment;

FIG. 1*h* is a set of graphs showing the digitized output of the final coder in that embodiment;

Figure 1A:
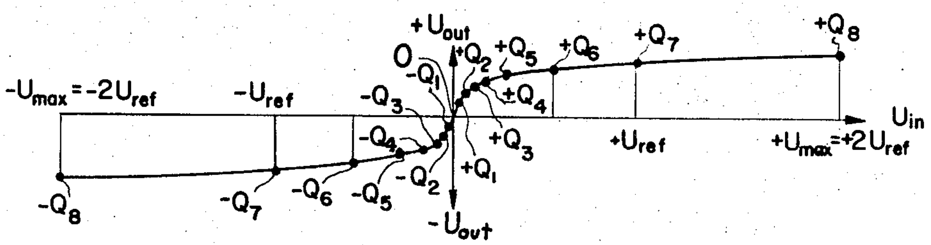

In FIG. 1*a* I have shown a compression characteristic of the type described above, representing the variation of the output voltage $U_{out}$ of an amplitude converter in response to different input voltages $U_{in}$ ranging between a negative limit $-U_{max}$ and a positive limit $+U_{max}$ of the same absolute magnitude. Also indicated in the graph is a reference voltage $U_{ref}$, with $U_{max} = 2U_{ref}$. The positive branch of the curve, lying in the first quadrant, and its negative branch, lying in the third quadrant, are mutually symmetrical about the origin O and are each subdivided at points $+Q_1$ to $+Q_8$ and $-Q_1$ to $-Q_8$ into $2^m$ linear segments, there being eight such segments ($m = 3$) in the example given. The first six segments of the positive branch have been shown more clearly in FIG. 1*b;* because of the symmetry, the subsequent discussion will be limited to this positive branch.

The seven knee point $Q_1 - Q_7$ of the curve are progressively spaced along the abscissa according to a binary law, with the exception of the first two points $Q_1$, $Q_2$ defining bands of like width (equal to $U_{ref}/64$) for the amplitude of input voltage $U_{in}$. Thus, the width of the third band (between the points $Q_2$ and $Q_3$) is $U_{ref}/32$, that of the forth band is $U_{ref}/16$, and so forth to a maximum value of $U_{ref}$ for the eighth band. The slopes of the several linear segments defined by these knee points decrease in the same binary ratio (being identical for the first two segments) so that the output voltage $U_{out}$ rises from one point to the next by a constant differential $\Delta U$. With the spread $\Delta U$ quantized in $2^n$ steps, as indicated along the ordinate in FIG. 1*b* for $n = 4$, the magnitude of $+U_{in}$ may be coded in $m+n = 7$ bits. An additional bit, ranking above the others, may be used to discriminate between positive and negative polarity so that the entire range between $-U_{max}$ and $+U_{max}$ can be covered by $m+n+1 = 8$ bits.

Figure 1B:
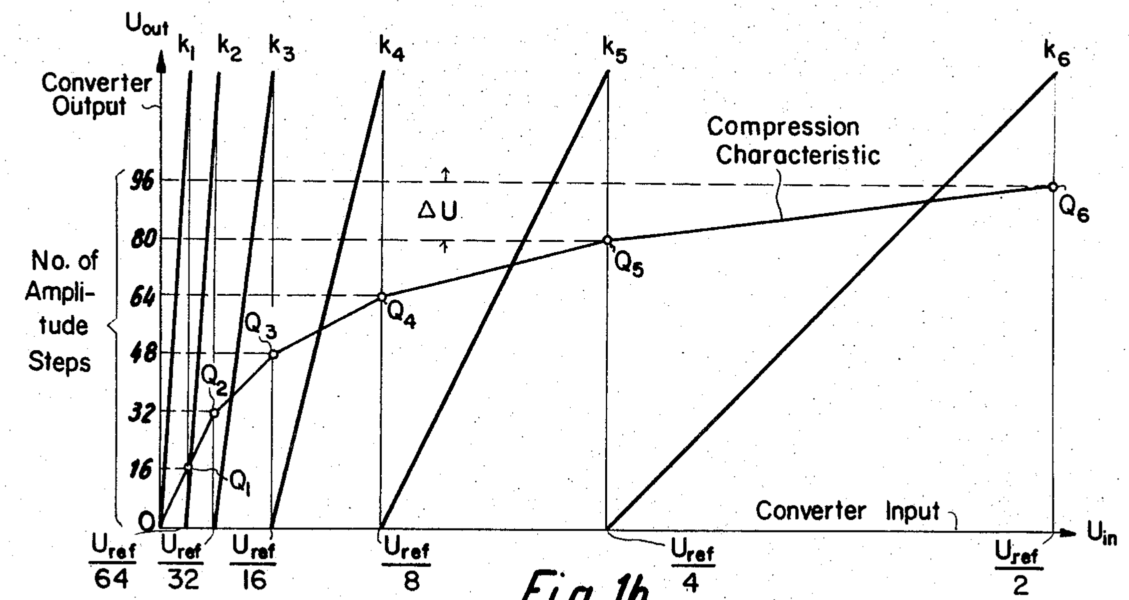

FIG. 1*b* also shows a series of straight lines $k_1 - k_6$ representing, by their slopes, the amplification ratio of an amplitude converter operating in the range between 0 and $U_{ref}/2$, the slopes of these lines being related to those of the corresponding curve segments by a suitable proportionality factor $p$ (see FIG. 1*c*) depending upon the step-down (or possibly step-up) ratios in other parts of the system. Since only the relative magnitudes of these slopes are significant, their absolute value could also be fractional so as to provide amplitude reduction rather than magnification. Again, the first two slopes $k_1$ and $k_2$ are identical as is necessary, because of the logarithmic character of the binary law, in order to extend the curve to the origin.

The width of each of the first two bands, equaling $U_{ref}/64$, may also be given as $U_{max}/128$ or, more generally, $U_{max}/2^{(2m-1)}$.

Figure 2:
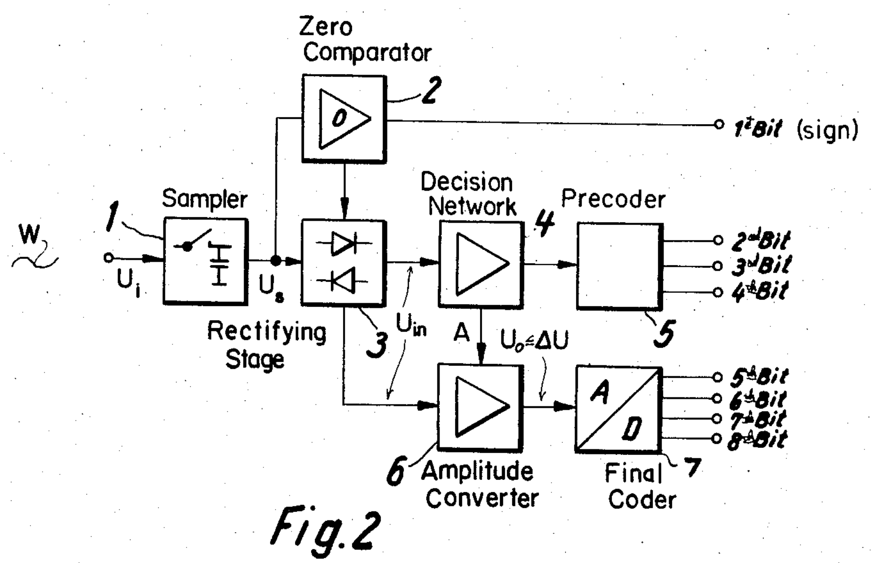
FIG. 2 is a block diagram of a more basic embodiment of my invention.

Reference will now be made to FIG. 2 which shows a pulse-code modulator utilizing an amplitude converter with the characteristic just discussed. The system includes an input stage 1 for the sampling and temporary storage of the instantaneous amplitude $U_i$ of an incoming signal wave W; this stage, described in greater detail hereinafter with reference to FIG. 3, works into a zero comparator 2 and in parallel therewith into a rectifying stage 3, both more completely shown in FIG. 4. Comparator 2 generates the first bit to indicate the sign of the instantaneous wave amplitude; it also controls the rectifying stage 3 to invert the stored signal voltage $U_s$ if the same has a specified (e.g. negative) polarity.

The signal voltage $U_{in}$ emerging from rectifier 3 is quantized in a decision network 4 which feeds a precoder 5 to generate a partial three-bit code identifying one of the eight bands discussed in connection with FIGS. 1*a* and 1*b*; the corresponding bits are in second, third and fourth position in the eight-bit code word to be transmitted to a remote station for demodulation by a conventional PCM receiver operating on an expanding characteristic complementary to that of FIGS. 1*a* and 1*b*.

The analog signal from rectifier 3 and the quantized output A from network 4 are also applied to an amplitude converter 6 which derives therefrom an output voltage $U_o$ within the spread $\Delta U$ for digitization by a final coder 7, of conventional design, generating a partial four-bit code consisting of the fifth, sixth, seventh and eigth bits of the binary word. These latter bits thus define one of sixteen steps within the band identified by the precoder 5, the spacing of the steps being relatively small in the first band and relatively large in the eighth band. This relationship, as is well known, enables message transmission with improved signal-to-noise ratio for low-amplitude signals.

Figure 3:
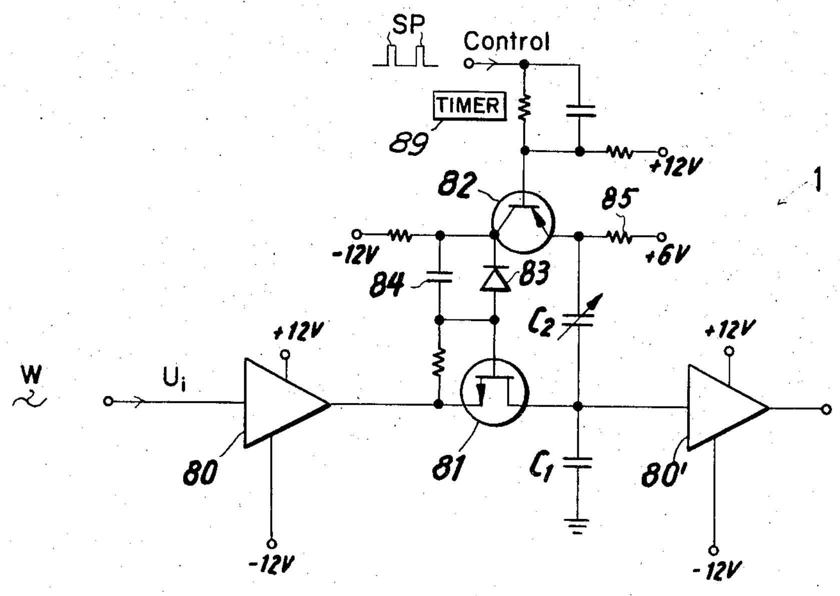
FIG. 3 is a circuit diagram of a sampling and holding circuit in the input of the modulator shown in FIG. 2.

FIG. 3 shows an advantageous embodiment of the input stage 1 designed for rapid sampling and for the suppression of the dynamic zero offset normally encountered in such circuits. A storage capacitor $C_1$ receives a charge of either polarity through an operational amplifier 80 having fixed positive and negative driving voltages (here of ±12 V) applied thereto. Such an amplifier, which may be of the integrated type, has its output terminal directly connected to its subtractive (i.e. inverting) input terminal by a circuit not shown in FIG. 3 but illustrated in FIG. 4 for a generally similar amplifier 61. If this amplifier, of gain $\alpha$, receives at its additive (or noninverting) input terminal a voltage $V_i$ to be converted into an output voltage $V_o$ which is fed back to its subtractive input terminal, the two voltages must satisfy the equation $(V_i - V_o)\alpha = V_o$ whence $V_o = V_i\alpha/(1 + \alpha)$ so that $V_o \approx V_i$ for $\alpha >> 1$. Thus, the charging amplifier has an amplification factor of substantially unity, along with a very high input impedance and a very low output impedance.

A generally identical operational amplifier 80' is used to read the charge of capacitor $C_1$. The charging circuit of this capacitor includes an electronic switch designed as a field-effect transistor 81 whose control gate is connected through a diode 83, shunted by a condenser 84, to the collector of a PNP switching transistor 82 whose base receives sampling pulses SP from a timer 89. With transistor 82 cut off, the gate of FET 81 is strongly negative and the flow of charging current is blocked. In the presence of a sampling pulse SP, transistor 82 conducts and transmits an unblocking pulse to the gate through condenser 84 so that capacitor $C_1$ is charged to the new amplitude level of signal voltage $U_i$. The large voltage jump at the time of switchover is unavoidably transmitted to capacitor $C_1$ through the spurious interelectrode capacitance of the field-effect transistor 81 to as to tend to alter the magnitude of the stored sample. This effect is the more pronounced the smaller the capacitance $C_1$ which, on the other hand, should be as low as possible to facilitate rapid charging inasmuch as the high input resistance of reading amplifier 80' enables even a small storage capacitor to hold its charge for the necessary length of time.

In order to compensate for the detrimental effect of the switching transients, an ancillary condenser $C_2$ is inserted between the emitter of switching transistor 82 and the capacitor $C_1$, this emitter being connected to its source of operating voltage (here of +6 V as against a collector voltage of −12 V and a base voltage of +12 V) through a biasing resistor 85 which causes the transistor 82 to operate as an emitter-follower in feeding a balancing pulse to capacitor $C_1$ through the advantageously adjustable condenser $C_2$. With proper adjustment of this condenser, the effect of the sampling pulse upon the magnitude of the stored charge can be neutralized.

Figure 4:
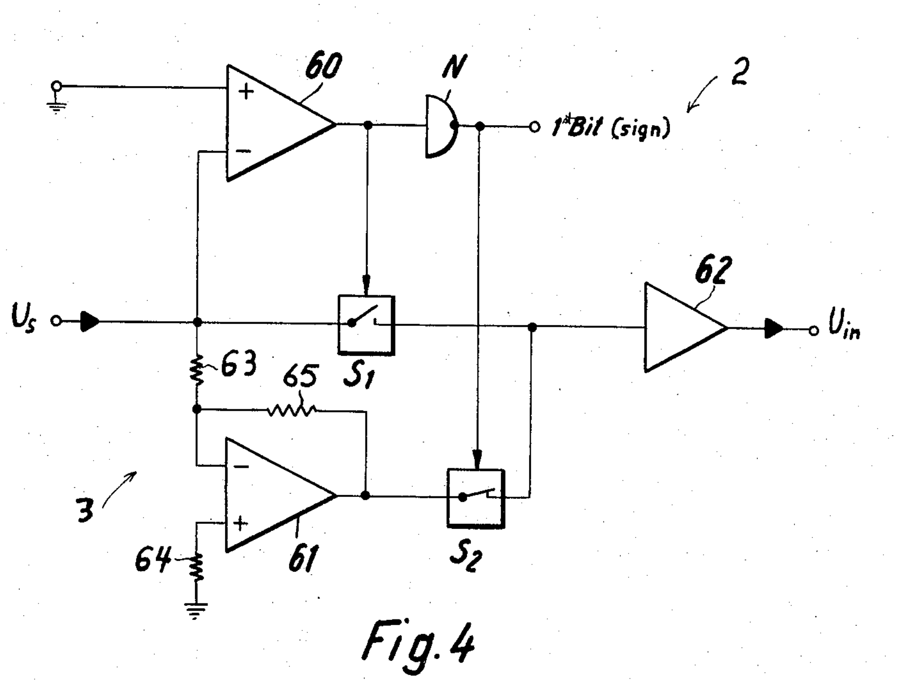
FIG. 4 is a more detailed block diagram of a rectifying stage in the embodiment of FIG. 2.

FIG. 4 shows the zero comparator or polarity detector 2 together with the rectifying stage 3, the components being advantageously combinted into an integrated module. Comparator 2 comprises a differential amplifier 60 with an additive input (+) at ground potential and a subtractive input (−) receiving the stored signal voltage $U_s$ from the output of sampler 1. The same signal voltage is fed via a resistor 63 to the subtractive input of the aforementioned operational amplifier 61 which, in the manner described with reference to amplifiers 80 and 80' of FIG. 3, has a fixed resistor 65 inserted between that input and its output. The additive input of amplifier 61, which forms part of the rectifier 3, is grounded through a resistor 64. Since, as discussed above, such an operational amplifier generates an output voltage substantially equal to the potential difference between its additive and subtractive input terminals, the application of signal voltage to its subtractive input causes the amplifier input 61 to act as an inverter. Amplifier 60, which is of the unipolar type, has no output in the presence of a positive input signal but works into a negator N having a true output under these conditions. Two switches $S_1$ and $S_2$ are located in the direct path of signal $U_s$ and in its inverted path, i.e. in the output of amplifier 61, respectively; switch S is controlled by the direct output of amplifier 60 whereas switch $S_2$ responds to the output of negator N so that these two switches are alternately opened and closed. In the specific case assumed, each switch makes when its controlling voltage is zero and breaks when that voltage assumes a finite value; a positive signal voltage $U_s$ is therefore passed by the switch $S_1$ directly to a further amplifier 62, acting as an impedance transformer, whereas a negative signal voltage is inverted in amplifier 61 and fed to amplifier 62 by way of switch $S_2$. The two switches advantageously are constituted by bidirectional electronic devices such as the field-effect transistor 81 of FIG. 3; the same applies to other switches described hereinafter and represented diagrammatically as pairs of contacts.

Figure 5:
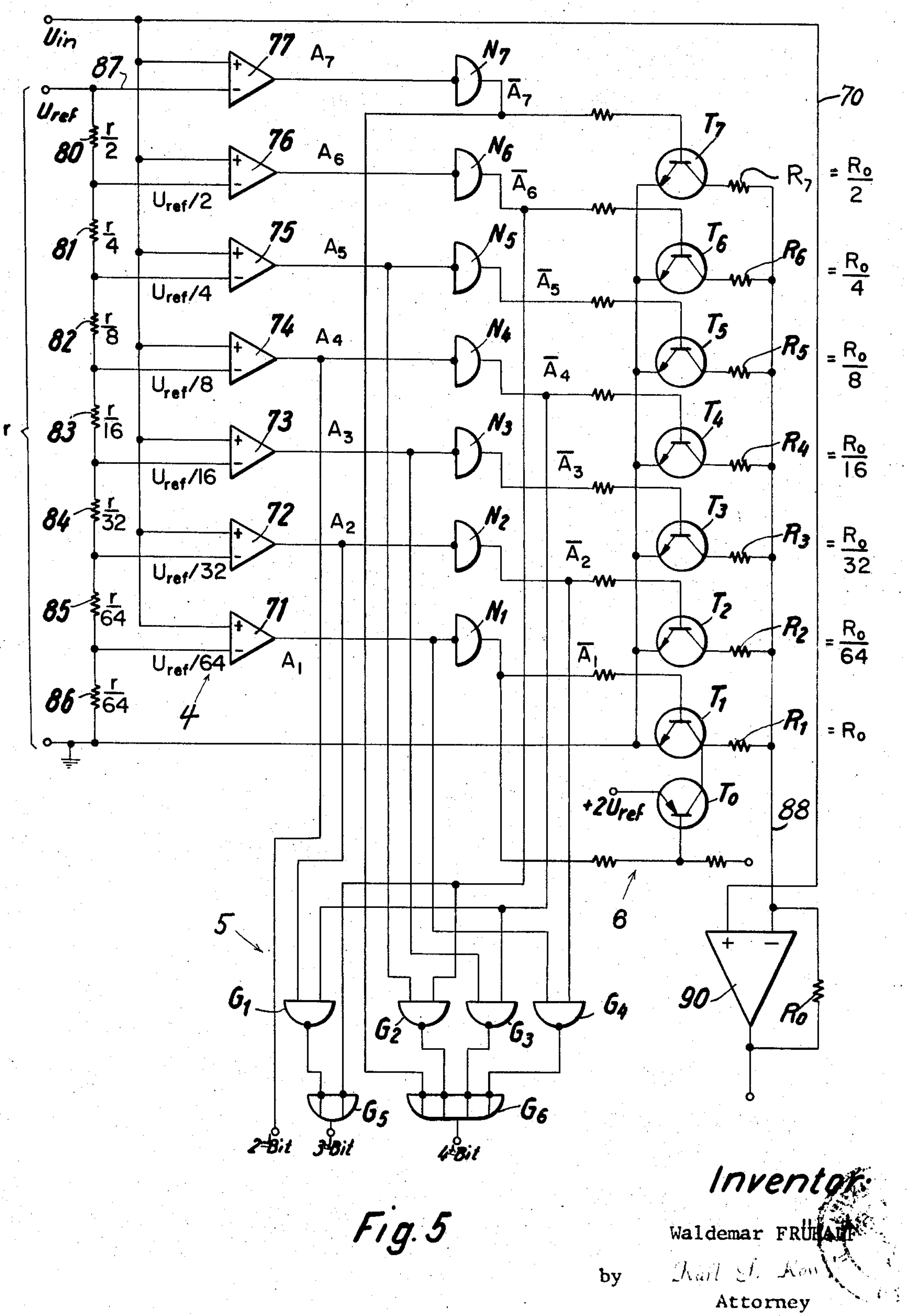
FIG. 5 is a circuit diagram showing details of a decision network and an associated precoder included in the system of FIG. 2.

Details of the decision network 4, the precoder 5 and the amplitude converter 6 are shown in FIG. 5. Network 4 comprises seven quantizing stages in the form of respective comparators 71 – 77 each similar to the differential amplifier 60 of FIG. 4, their additive inputs (∓) being multipled to a bus bar 70 carrying the input voltage $U_{in}$ (from the output of the amplifier 62, FIG. 4) while their subtractive inputs (−) are tied to different taps on a voltage divider of overall resistance *r* connected between ground and a conductor 87 of potential $U_{ref}$. This voltage divider consists of a series of resistors 80 – 86 so proportioned that successive junctions, starting from the ungrounded terminal of the chain, have potentials equaling consecutive binary fractions of $U_{ref}$. Thus, the respective magnitudes of resistors 80 – 86 are $r/2$, $r/4$, $r/8$, $r/16$, $r/32$, $r/64$ and $r/64$. With conductor 87 connected directly to the subtractive input of conparator 77, the junction of resistors 80 and 81 (potential $U_{ref}/2$) is tied to the corresponding input of comparator 76, that of resistors 81 and 82 (potential $U_{ref}/4$) is joined to a like input of comparator 75, and so forth, the threshold voltage applied to the subtractive input of the last comparator 71 by the junction of resistors 85 and 86 being equal to $U_{ref}/64$. Input voltage $U_{in}$ on bus bar 70 is therefore quantized, with one or more comparators 71–77 conducting whenever that voltage exceeds the first threshold $U_{ref}/64$.

Amplitude diseriminators 71 – 77 work into respective negators ($N_1$ – $N_7$) whose true outputs, if present, bias respective NPN transistors $T_1$ – $T_7$ into saturation, i.e. a stage in which the effective resistance of each of these transistors drops to a negligible value of about 1 ohm. Transistors $T_1$ – $T_7$ have their emitters grounded and have their collectors connected through respective resistors $R_1$ – $R_7$ to a bus bar 88 terminating at the subtractive input terminal of another operational amplifier 90 which will be described in greater detail with reference to FIG. 6 and is similar to amplifier 61 of FIG. 4. The additive input terminal of amplifier 90 is connected to bus bar 70 to receive the analog voltage $U_{in}$ therefrom. If this analog voltage is below the first threshold $U_{ref}/64$, all the negators $N_1$ – $N_7$ conduct and all the NPN transistors $T_1$ – $T_7$ are saturated; a further transistor $T_0$, of PNP type, is connected between resistor $R_1$ and a source of biasing voltage equal to $+2U_{ref}$, transistor $T_0$ being cut off under these conditions. As soon as voltage $U_{in}$ rises into or beyond its second amplitude band, comparator 71 responds so that negator $N_1$ cuts off the transistor $T_1$ and turns on the transistor $T_0$ which, saturating, switches the resistor $R_1$ from ground potential to biasing potential $+2U_{ref}$. The other resistors $R_2$ – $R_7$, normally grounded through their respective NPN transistors, are simply open-circuited by the response of the corresponding comparators 71 – 77.

The comparators and the associated negators, whose respective outputs have been designated $A_1$ – $A_7$ and $\bar{A}_1$ – $\bar{A}_7$, constitute the decision network 4 whereas the transistors $T_0$ – $T_7$ and the operational amplifier 90 form part of the amplitude converter 6. The precoder 5, also shown in FIG. 5, includes a number of NAND gates $G_1$–$G_6$; gates $G_5$ and $G_6$ (illustrated in the equivalent from of OR gates with inverting inputs) generate the third and fourth bits, respectively, while the second bit is directly obtained from the output $A_4$ of comparator 74. NAND gate $G_1$, working into one input of gate $G_5$, receives the outputs $A_2$ and $\bar{A}_4$ of comparator 72 and network $N_4$; the other input of gate $G_5$ is directly energized from the output $\bar{A}_6$ of negator $N_6$. Gate $G_5$ has a first input receiving the output $\bar{A}_7$ of negator $N_7$, a second input fed from gate $G_2$ which in turn is energized from outputs $A_5$ and $\bar{A}_6$ of comparator 75 and negator $N_6$, a third input supplied by the gate $G_3$ to which the outputs $A_3$ and $\bar{A}_4$ of comparator 73 and negator $N_4$ are delivered, and a fourth input tied to the output of gate $G_4$ which in turn derives its inputs from outputs $A_1$ and $\bar{A}_2$ of comparator 71 and negator $N_2$.

Figure 6:
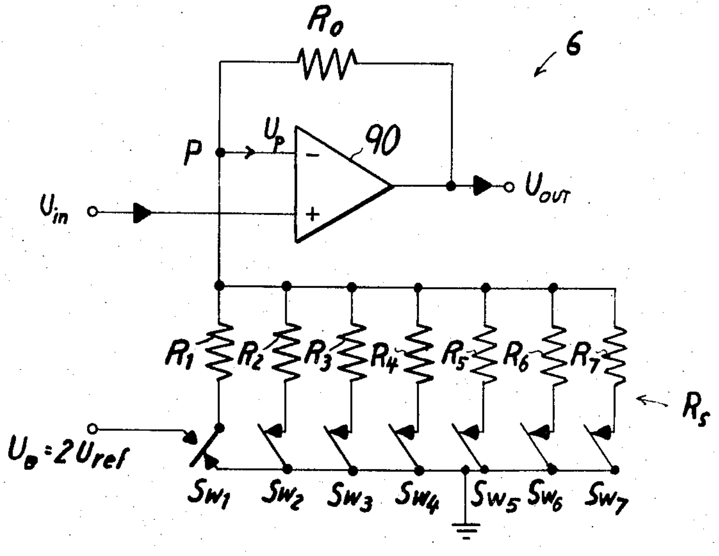
FIG. 6 is a more detailed diagram of an amplitude converter in the embodiment of FIG. 2.

The logic of FIG. 5 corresponds to the following Boolean equations for the three bits generated by the precoder 5:

bit No. 2 $= \bar{A}_4$
bit No. 3 $= A_2 \cdot \bar{A}_4$
bit No. 4 $= A_7 + A_5 \cdot \bar{A}_6 + \bar{A}_4 \cdot A_3 + \bar{A}_2 \cdot A_1$ FIG. 6 shows the operational amplifier 90 of FIG. 5 together with its biasing resistors $R_0$ and $R_1$ – $R_7$, the transistors $T_0$ – $T_7$ of FIG. 5 having been diagrammatically represented in FIG. 6 by switches $Sw_1$ – $Sw_7$ (with reversing switch $Sw_1$ replacing the two transistors $T_0$, $T_1$ of opposite conductivity type). Resistors $R_1$ – $R_7$, collectively designated $R_s$, form with resistor $R_0$ a voltage divider having a tap P connected to the subtractive input terminal (−) of the amplifier. Normally, i.e. with zero input voltage $U_{in}$, switch $Sw_1$ is on its grounded contact (corresponding to saturation of transistor $T_1$ in FIG. 5) while the six other switches are closed.

Disregarding for the present the biasing voltage $U_B = +2U_{ref}$, we can establish the following relationship between input voltage $U_{in}$, output voltage $U_{out}$ and feedback voltage $U_p$ (at point P):

$$U_{out} = (U_{in} - U_p)\,\alpha = \left(U_{in} - \frac{U_{out} R_s}{R_s + R_0}\right)\alpha$$

whence $$U_{out}\left(1 + \frac{\alpha R_s}{R_s + R_0}\right) = \alpha U_{in}$$

or $$\frac{U_{out}}{U_{in}} \equiv k = \frac{\alpha}{1 + \frac{\alpha R_s}{R_s + R_0}}$$

reducing, for $\alpha >> 1$, to $k \approx 1 + (R_0/R_s)$. 1
It will thus be seen that the amplification factor $k$ depends on the relative magnitude of $R_0$ and $R_s$ whereby the change in this factor can be accomplished by open-circuiting one or more of the branches $R_1$ – $R_7$ of the grounded portion $R_s$ of the voltage divider.

As indicated in FIG. 5, the weighting resistances $R_1$ – $R_7$ bear the following binary relationship with the fixed resistance $R_0$:

$R_1 = R_0$
$R_7 = R_0/2$
$R_6 = R_0/4$
$R_5 = R_0/8$
$R_4 = R_0/16$
$R_3 = R_0/32$
$R_2 = R_0/64$

The largest of these resistors, $R_1$, has the least electrical weight because of its connection in parallel with the others.

The magnitude of resistance $R_s$ is given by $$\frac{1}{R_s} = \sum_1 \frac{1}{R_i}$$

where $R_i$ designates any of the weighting resistors $R_1$ – $R_7$ effectively connected in circuit. For low input voltages $U_{in}$, i.e. with all switches $Sw_1$ – $Sw_7$ in their illustrated positions, $R_s = R_0/127$ corresponding to an amplification factor $k = 128 = 2^{(2^m - 1)}$.

Let us now consider the case of an input voltage falling within the second-lowest band, i.e. ranging between $U_{ref}/64$ and $U_{ref}/32$. Switch $Sw_1$ is now reversed so that biasing voltage $U_B = +2U_{ref}$ is connected through weighting resistor $R_1$ to the tap P of the voltage divider, i.e. to the subtractive input of amplifier 90. Under these conditions the magnitude of feedback potential $U_p$ is given by the relationship $$U_P = \frac{R_s(U_L + U_{out})}{R_0 + 2R_s}$$

whence $$U_{out}=U_{in}\left(\frac{R_0}{R_s}+2\right)-2U_{ref}$$

The magnitude of $R_s$ has now been changed to $R_0/127$ so that, within the amplitude band considered, $U_{out} = 128U_{in} - 2U_{ref}$. For the lower limit of the second band, i.e. for $U_{in} = U_{ref}/64$, this corresponds exactly to $U_{out} = 0$. The slope of the linear function $U_{out} = f(U_{in})$ within the second band is identical with that in the first band, i.e. $k = 128$.

In the third band, with switch $Sw_2$ open to disconnect resistance branch $R_2$, $R_s = R_0/63$. Thus, we now have $U_{out} = 64U_{in} - 2U_{ref}$, this function being again a straight line starting with $U_{out} = 0$ at the lower band limit of $U_{in} = U_{ref}/32$. The slope is now half that of the previous two functions, i.e. $k = 64$. Thus, the function $U_{out} = f(U_{in})$ corresponds precisely to the straight lines $k_1$, $k_2$ etc. illustrated in FIG. 1*b*. In the highest band, with all switches $Sw_2 - Sw_7$ open, $R_s = \infty$ so that $U_{out} = 2(U_{in} - U_{ref})$; the amplification factor is now 2.

Figure 7:
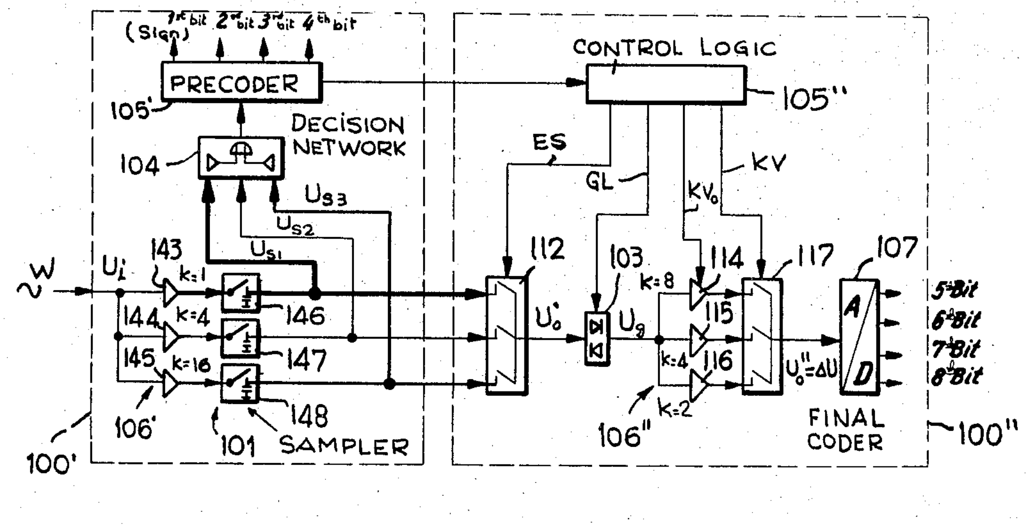
FIG. 7 is a block diagram of another embodiment, referred to in conjunction with FIGS. 1*c* – 1*h;*

According to FIG. 7, in which elements having counterparts in the foregoing Figures have been designated by the same reference numerals preceded by a "1" in the position of the hundreds digit, the amplitude converter 6 of the aforedescribed embodiment has been split into two stages 106' and 106'' forming part of a precoding module 100' and a final-coding module 100'', respectively. Converter stage 106' comprises three operational amplifiers 143, 144 and 145 which take the place of charging amplifier 80, FIG. 3, and are connected in parallel to a common input carrying the signal voltage $U_i$, these three amplifiers having respective amplification factors $k = 1$, $k = 4$ and $k = 16$. Module 100' further includes a sampler 101, with three sections 146, 147 and 148 respectively energized by amplifiers 143, 144 and 145, a decision network 104 with three inputs receiving the output voltages $U_{s1}$, $U_{s2}$ and $U_{s3}$ of sampler sections 146 – 148, and a precoder 105' controlled by the network 104, this precoder generating the first four bits (including the polarity bit) of the eight-bit code word representing the binary equivalent of the instantaneous signal amplitude as modified by the compression characteristic. An extension 105'' of precoder 105', shown for convenience as included within module 100'', represents a logic network for the control of a first selector 112, inserted between converter stages 106' and 106'', an inverter stage 103 for changing the output voltage $U_0'$ of this selector (FIG. 1*e*) into a rectified voltage $U_g$ (FIG. 1*f*), a second selector 117 following the converter stage 106'' to deliver a voltage $U_o''$ (FIG. 1*g*) of maximum amplitude $\Delta U$, and a final coder 107 which generates the fifth, sixth, seventh and eighth bits. Converter stage 106'' includes three operational amplifiers 114, 115 and 116, each of the type described in conjunction with FIG. 6, whose feedback resistances are selected to give them amplification factors $k = 8$ (amplifier 114), $k = 4$ (amplifier 115) and $k = 2$ (amplifier 116). The several outputs of control logic 105'', shown in greater detail in FIG. 10, have been diagrammatically illustrated in FIG. 7 as single lines including a line ES terminating at selector 112, a line GL leading to rectifier 103, a line KV controlling the selector 117, and a further line $KV_o$ terminating at amplifier 114 for the purpose of selectively switching one of its weighting resistances between ground and a fixed biasing voltage of magnitude $2U_{ref}$ as described above in connection with resistor $R_1$ of FIG. 6.

The various amplification factors of amplifiers 143 – 145 and 114 – 116 enable the selective establishment of the same seven different amplification ratios as in the preceding embodiment, ranging between 128:1 and 2:1, by connecting different combinations of these amplifiers in tandem through the closure of appropriately chosen switch combinations in selectors 112 and 117. Thus, closure of the lowest switch of selector 112 gives an overall ratio of 128:1, 64:1 or 32:1, as required for the four lowest amplitude bands, according to whether the upper, the middle or the lower switch of selector 117 conducts. With the middle switch of selector 112 conducting, closure of either the middle switch or the lower switch of selector 117 yields the ratios 16:1 and 8:1 needed for the next two bands. Upon the closing of the top switch of selector 112, corresponding to an amplification factor of unity in the first converter stage 106', an overall ratio of 4:1 or 2:1 can be established by closing either the middle switch or the bottom switch of selector 117. The logic circuit for carrying out these selective switching operations, under the control the quantized output of network 104, is described hereinafter with reference to FIG. 10.

Figure 8:
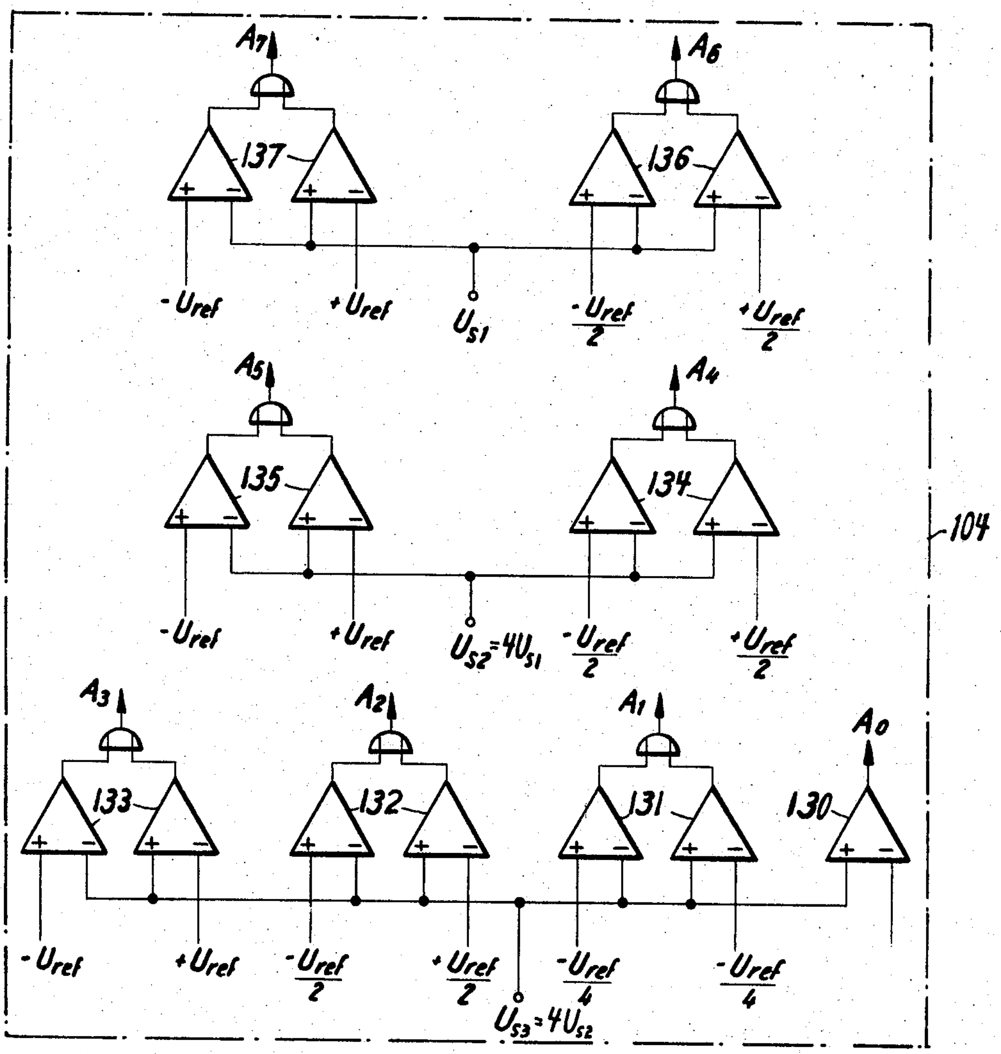
FIG. 8 is a diagram showing details of a decision network in the embodiment of FIG. 7.
Figure 9:
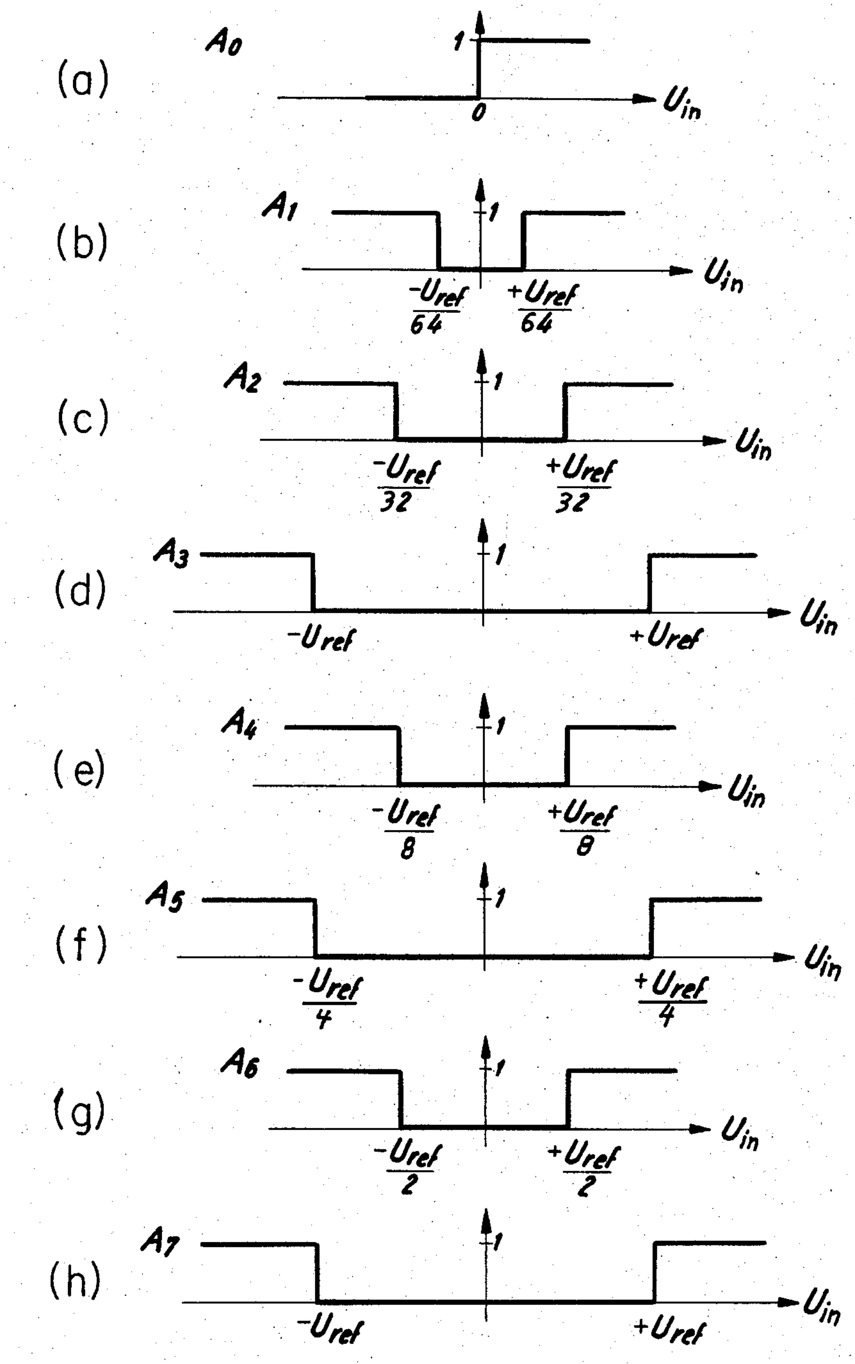
FIG. 9 is a set of graphs showing the quantized output of different stages of the network of FIG. 8.

As shown in FIG. 8, the decision network 104 includes a zero comparator 130 (similar to comparator 60 of FIG. 4) and seven dual comparators 131 – 137 generating respective outputs $A_0 - A_7$. Comparators 136 and 137 receive the nonamplified input voltage $U_{s1}$ as passed by the amplifier 134 of FIG. 7 ($k = 1$) and sampled in section 146 of storage unit 101. This voltage is applied to the additive input of one comparator and to the subtractive input of the other comparator of each pair 136, 137 whose remaining inputs are biased with voltages equal to $\pm U_{ref}/2$ and $\pm U_{ref}$, respectively. Comparators 134 and 135 operate on input voltage $U_{s2} = 4U_{s1}$, the biasing voltages being the same as for comparators 136 and 137, respectively. Comparators 131, 132 and 133 are energized by input voltage $U_{s3} = 4U_{s2} = 16U_{s1}$ which is being matched against respective biasing voltages $\pm U_{ref}/4$, $\pm U_{ref}/2$ and $\pm U_{ref}$. The resulting binary outputs have been illustrated in graphs (*a*) – (*h*) of FIG. 9.

As shown in graph (*a*), the output $A_0$ is false (i.e. has the logical value "0") for all negative voltages $U_{in}$ and is true (i.e. has the logical value "1") for all positive input voltages. Graph (*b*) shows the output $A_1$ to be true everywhere except within the region from $-U_{ref}/64$ to $+U_{ref}/64$. Output $A_2$, graph (*c*), is false within the region from $-U_{ref}/32$ to $+U_{ref}/32$, as shown. The corresponding region for output $A_3$, graph (*d*), extends from $-U_{ref}/8$ to $+U_{ref}/8$. According to graphs (*f*), (*g*) and (*h*), the outputs $A_3$, $A_6$ and $A_7$ are suppressed within limits $\pm U_{ref}/4$, $\pm U_{ref}/2$ and $\pm U_{ref}$, respectively.

Figures 1C, 1D, 1E, 1F, 1G, 1H:
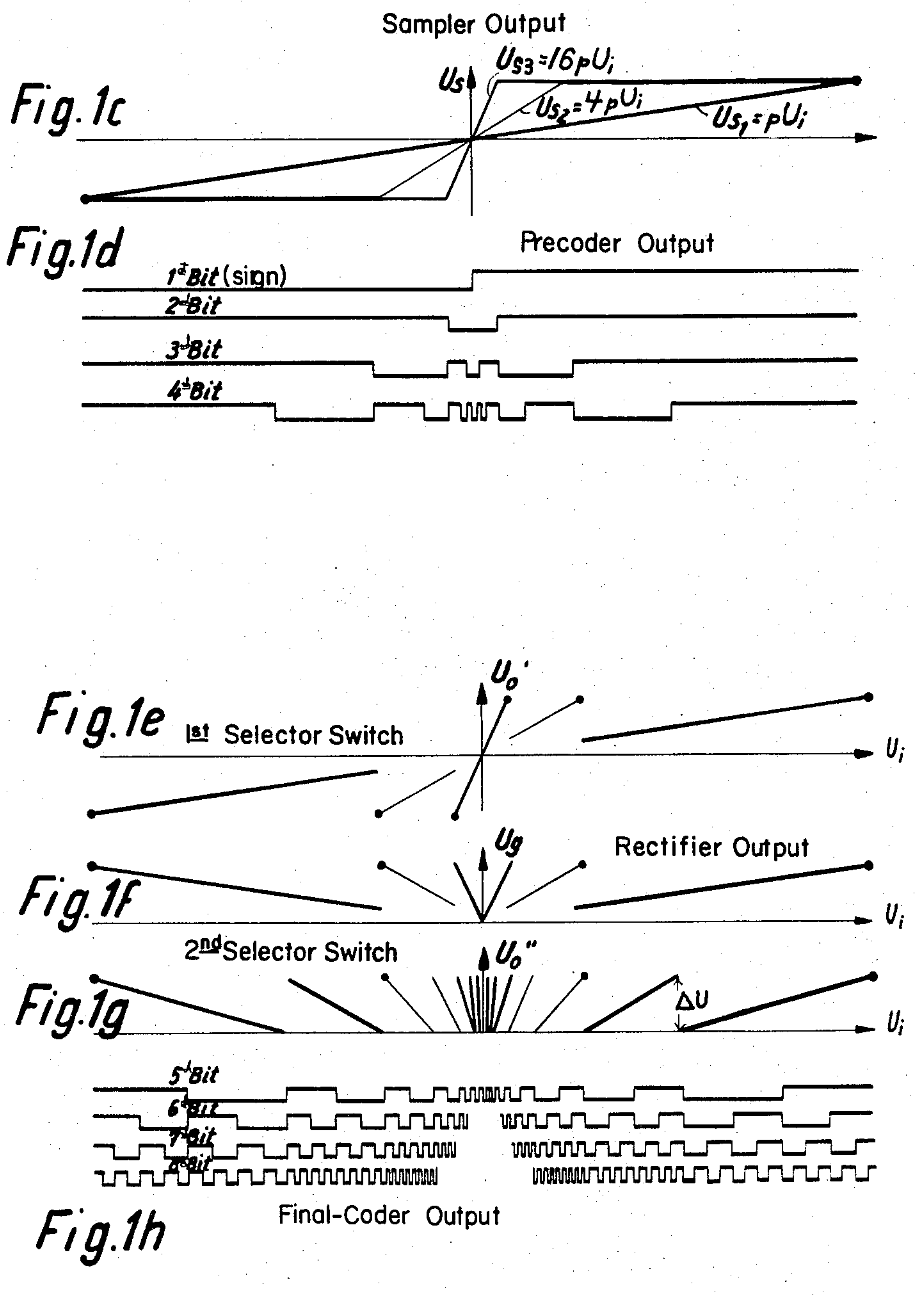

FIG. 1*c* shows the amplification factors of the three operational amplifiers 143, 144 and 145 as manifested in the outputs $U_{s3}$, $U_{s2}$ and $U_{s1}$ of corresponding sampling sections 146, 147 and 148. The horizontal lines at the top and the bottom of this graph indicate the saturation of amplifiers 146 and 147 at the limits of their linear operating ranges. These operating ranges correspond in FIG. 1*a* to the curve portion bounded by points $-Q_4$ and $+Q_4$ for amplifier 146, the portion bounded by points $-Q_6$ and $+Q_6$ for amplifier 147, and the complete range between end points $-Q_8$ and $+Q_8$ for amplifier 148.

Figure 10:
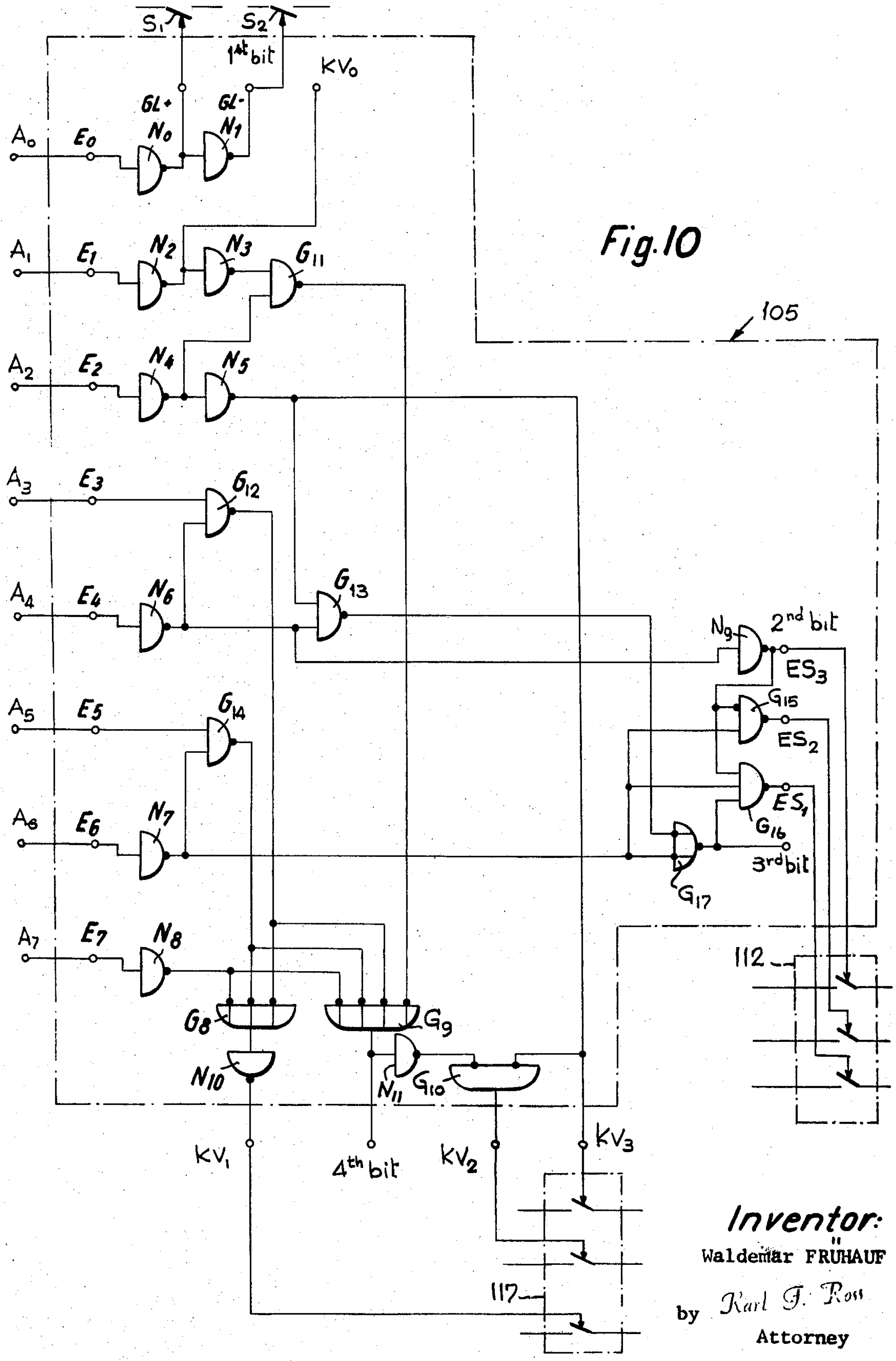
FIG. 10 is a circuit diagram of a precoder and control logic included in the system of FIG. 7.

FIG. 10 shows a logic circuit 105 which combines both the precoder 105' and the controller 105'' of FIG. 7. This circuit has eight inputs $E_0 - E_7$ respectively tied to the outputs $A_0 - A_7$ of FIG. 8. Input $E_0$ is connected through two cascaded negators $N_0$ and $N_1$ to a lead GL− which, together with a lead GL+ extending from the output of negator $N_0$, constitutes the line GL shown in FIG. 7. Lead GL− carries the first (sign) bit and controls the switch $S_2$ (cf. FIG. 4) of rectifier 103 which is identical with the inverting stage 3 of the first embodiment; its companion switch $S_1$ is controlled by lead GL+. It is recalled that these switches, advantageously constituted by field-effect transistors as already noted, are open in the energized state and closed in the de-energized state of their respective control leads. Thus, the presence of a true input $E_0$ (indicative of a positive input voltage $U_{s3}$) cuts off the negator $N_0$ to close the switch $S_1$ while negator $N_1$ conducts to open the switch $S_2$.

Input $E_1$ is connected through a negator $N_2$ to the lead $KV_0$ which controls the amplifier 114 (FIG. 7) to switch one of its weighting resistances from ground to biasing voltage $U_B$ (cf, FIG. 6) whenever the input voltage $U_{s3}$ rises above the lowest threshold $U_{ref}/64$, in the manner and for the reason already explained. The output of negator $N_2$ is delivered through a further negator $N_3$ to an input of a NAND gate $G_{11}$ having its other input connected through another negator $N_4$ to network input $E_2$. Negator $N_4$ works through a negator $N_5$ into a lead $KV_3$ which, together with two further leads $KV_1$ and $KV_2$, forms part of the line designated KV in FIG. 7 and controlling the selector 117. Lead $KV_3$, energized in the presence of a true input $E_2$, opens the top switch of selector 117 to deactivate the operational amplifier 114, of amplification ratio $k = 8$, whenever the amplitude of the signal $U_{s3}$ rises above the second step equal to $U_{ref}/32$. Negator $N_5$ also works into an AND gate $G_{10}$ generating the control signal on lead $KV_2$ for the middle switch of selector 117; also connected to the output of negator $N_5$ is an input of a NAND gate $G_{13}$ whose other input receives the signal on network input $E_4$ through a negator $N_6$. The output of the latter negator is fed to a NAND gate $G_{12}$, also receiving the signal on input $E_3$, and in parallel therewith through a negator $N_9$ to a lead $ES_3$ which with two similar leads $ES_1$, $ES_2$ forms part of the line ES shown in FIG. 7. Lead $ES_3$, which carries the second bit, controls the top switch of selector 112 to open it whenever that bit has the logical value "1", i.e. in the presence of a true input $E_4$. Input $E_5$ terminates at a NAND gate $G_{14}$ also receiving the signal of input $E_5$ through a negator $N_7$, the latter feeding respective inputs of two NAND gates $G_{15}$, $G_{17}$ as well as a NAND gate $G_{16}$ feeding the lead $ES_1$ which controls the bottom switch of selector 112 to close it in the presence of a true input $E_6$. Gate $G_{17}$ generates the third bit of the code word. Gate $G_{15}$, whose other input is connected to lead $ES_3$, works into lead $ES_2$ which controls the middle switch of selector 112, closing it upon the simultaneous presence of an input $E_4$ and absence of an input $E_6$.

Input $E_7$ is connected through a negator $N_8$ to one input of a NAND gate $G_8$ whose other two inputs receive the outputs of NAND gates $G_{12}$ and $G_{14}$, gate $G_8$ works through a negator $N_{10}$ into lead $KV_1$ which controls the bottom switch of selector 117, closing it whenever the signal amplitude reaches the 4th, 6th or 8th band. Negator $N_8$ and NAND gates $G_{11}$, $G_{12}$ and $G_{14}$ are also connected to respective inputs of a NAND gate $G_3$ producing the fourth bit. A second input of the gate $G_{10}$ is excited through a negator $N_{11}$ from the output of the gate $G_9$. Thus, the middle switch of selector 117 is closed whenever the signal amplitude reaches the third, fifth or seventh band.

The following Boolean equations apply to the generation of bits Nos. 1 – 4 as well as to the energization of leads $KV_0 - KV_3$, $ES_1 - ES_3$ and GL+, GL− by the logic of FIG. 10 in the response to different combinations of outputs $A_0 - A_7$ of network 104;

first bit $= A_0$ second bit $= A_4$ third bit $= A_2 \cdot \overline{A}_4 + A_6$ fourth bit $= A_1 \cdot \overline{A}_2 + A_3 \cdot \overline{A}_4 + A_5 \cdot \overline{A}_6 + A_7$ $KV_0 = A_1$ $ES_3 = A_4$ $ES_2 = A_4 \cdot A_6$ $ES_1 = \overline{A_4 \cdot (A_2 \cdot A_4 + A_6)}$ $KV_1 = \overline{A_3 \cdot A_4 + A_5 \cdot A_6 + A_7}$ $KV_2 = \overline{A}_2(A_1 \cdot \overline{A}_2 + A_3 \cdot \overline{A}_4 + A_5 \cdot \overline{A}_6 + A_7)$ $KV_3 = A_2$ $GL+ = \overline{A}_0$ $GL- = A_0$ With this mode of operation, selector 112 completes the output circuit of amplifier 145 (lead $ES_3$ de-energized) as long as comparator 134 in FIG. 8 has no output, i.e. with the input voltage remaining beneath the threshold $U_{ref}/8$ of the fifth band (point $Q_4$ in FIG. 1*b*). In the next two bands, i.e. up to point $Q_6$, selector 112 renders the amplifier 144 effective (de-energization of lead $ES_2$). For all higher input voltages, amplifier 143 is operative (zero voltage on lead $ES_1$). This has been graphically illustrated in FIG. 1*e* which shows the output voltage $U_o'$ of selector 112 plotted against the input voltage $U_i$ of converter stage 106'. Following rectification in inverter stage 103, this output voltage has the form $U_g$ as shown in FIG. 1*f*. Finally, the second converter stage 106'' produces, together with selector 117, the output voltage $U_o''$ shown in FIG. 1*g*, this voltage being suitable for digitization by the final coder 107 whose output is illustrated in FIG. 1 *h*.

From FIGS. 1*d* and 1*h* it will be apparent that any of bits Nos. 3 – 8, generated partly by precoder 105' and partly by final coder 107, may represent the different spreads of analog values in accordance with the compression characteristic of FIG. 1*a*. For the lowest amplitude bands the sixth, seventh and eighth bits had to be omitted in FIG. 1*b* because of insufficient resolution.

Since the decision network 104 is connected to the output of sampler 101 ahead of the first selector 112, the position of that selector has no influence upon the quantizing operation of that network. On the other hand, the preamplification of the lower signal voltages by converter stage 106' greatly reduces the relative noise level in the input of the decision network so as to minimize operational errors.

Figure 11:
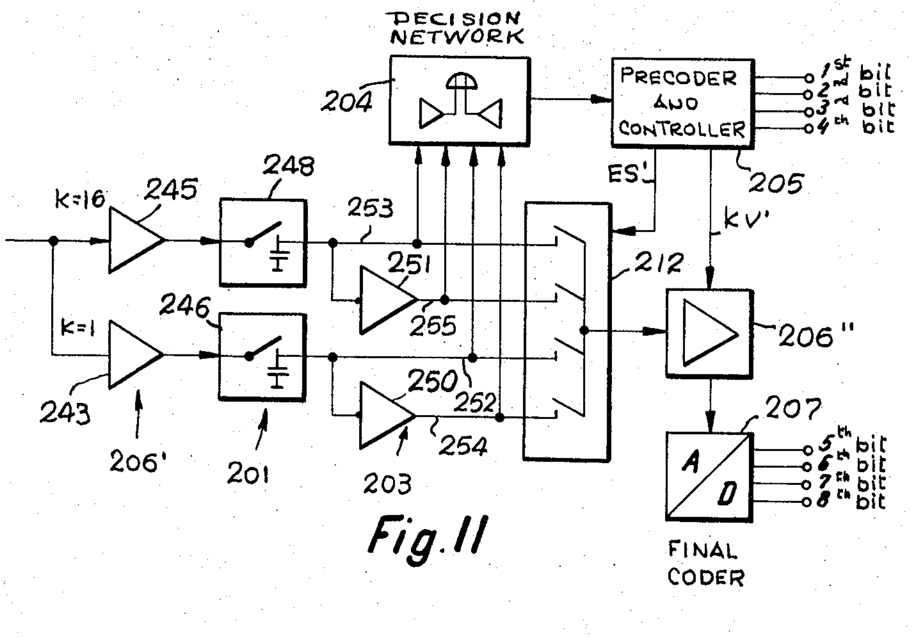
FIG. 11 is a block diagram similar to FIG. 7, illustrating a modification.

FIG. 11 shows a somewhat simplified system of the same general character as that of FIG. 7, i.e. with a preamplification stage 206' ahead of a sampler 201 and a second converter stage 206'' directly working into a final coder 207. Converter stage 206' comprises only two parallel amplifiers 243 and 245 of amplification factor $k = 1$ and $k = 16$ respectively, their outputs being chopped by associated sections 246 and 248 of sampler 201. A rectification stage 203 beyond sampler 201 includes two inverters 250 and 251; a decision network 204 receives the outputs of sampling sections 246, 248 directly over leads 252, 253 and via inverters 250, 251 over leads 254, 255. Leads 252 – 255 are also connected to a single selector 212 which is controlled from a logic circuit 205 via a line ES' and connects any one of these leads to the input of converter stage 206'' comprising a single operational amplifier of the type described in connection with FIG. 6. A lead KV' extending from logic circuit 205 to amplifier 206'' again serves to switch a least significant weighting resistance between ground and a fixed biasing potential, as described above, upon the input signal surpassing the first amplitude band as determined by the network 204 and reported to circuit 205 which also contains the precoder generating the first four bits. The final coder 207 produces bits Nos. 5 – 8 as in the preceding embodiment.

Network 204 receives voltages of only one polarity (assumed to be positive) from rectifier stage 203 so that its comparison matrix, generally similar to that shown in FIG. 8, can be simplified by replacing each dual comparator thereof with a single comparator. Depending on the origin of the signal, i.e. whether from a noninverting lead 252, 253 or an inverting lead 254, 255, a zero comparator similar to unit 130 and connected to, say, lead 253 from high-amplification unit 248 determines the character of the first bit emitted by logic 205 to indicate the polarity of the input signal. A first group of comparators in network 204, receiving the amplified voltage sample from section 248 via leads 253 and 255 over a common OR gate, compares that voltage sample with three different thresholds $+U_{ref}/4$, $+U_{ref}/2$ and $+U_{ref}$ in the manner shown for the right-hand halves of comparators 131, 132 and 133 in FIG. 8 to generate the outputs $A_1$ – $A_3$ discussed above; a second group of comparators, similarly energized from leads 252 and 254 through a common OR gate, makes the comparison with thresholds $+U_{ref}/8$, $+U_{ref}/4$, $+U_{ref}/2$ and $+U_{ref}$ to generate outputs $A_4$ – $A_7$. The logic 205 is generally similar to that of FIG. 10 except that the output $A_0$ of the zero comparator must be taken into account in determining which of the four switches of selector 212 is to be closed in response to a given amplitude and polarity of the input signal.

Since in FIG. 11 the voltages to be analyzed have all the same polarity, the electronic switches of selector 212 may be simpler than those of the selector 112 in FIG. 7.

Figure 12:
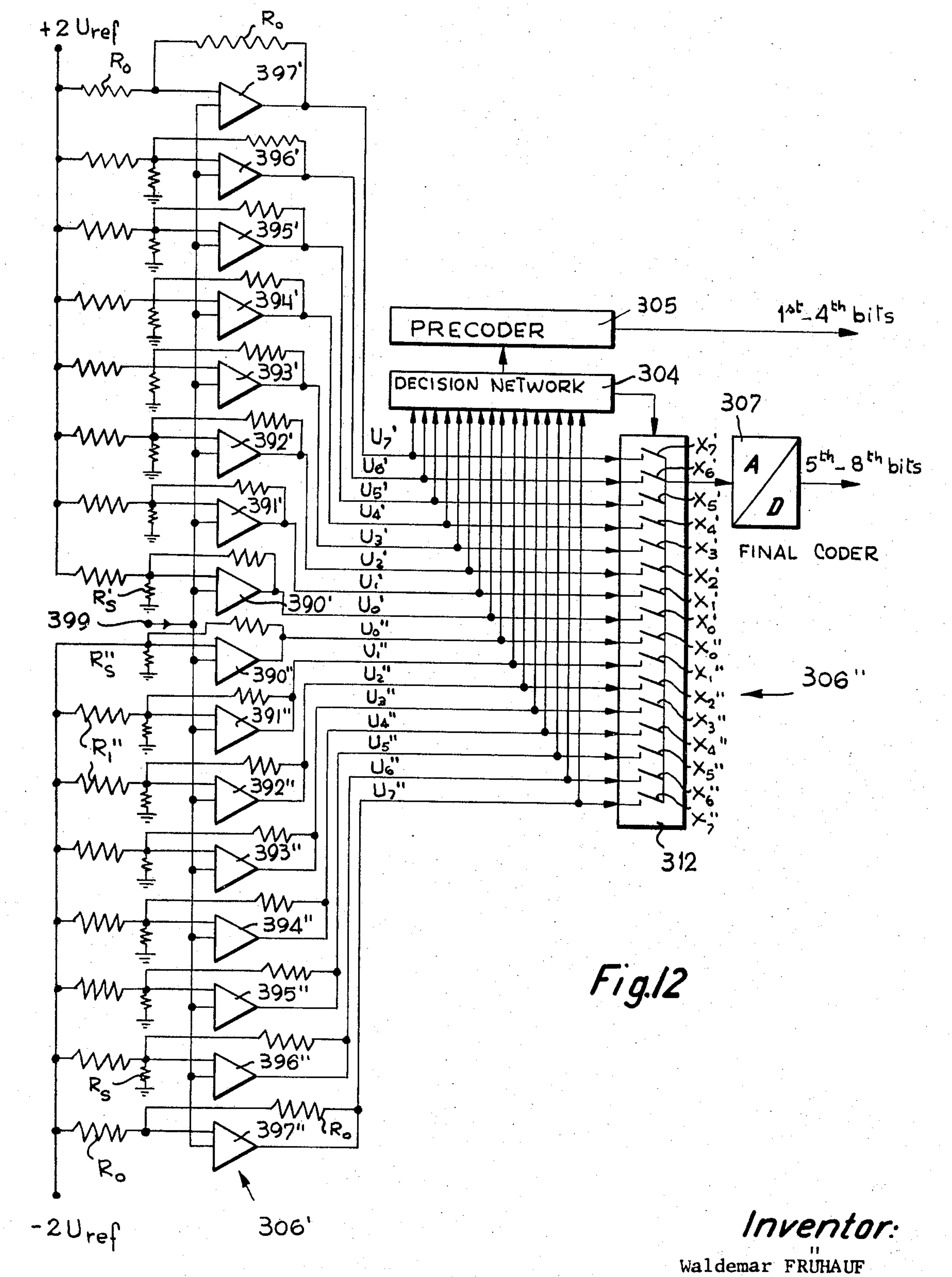
FIG. 12 is a block diagram relating to a further embodiment.
Figure 13:
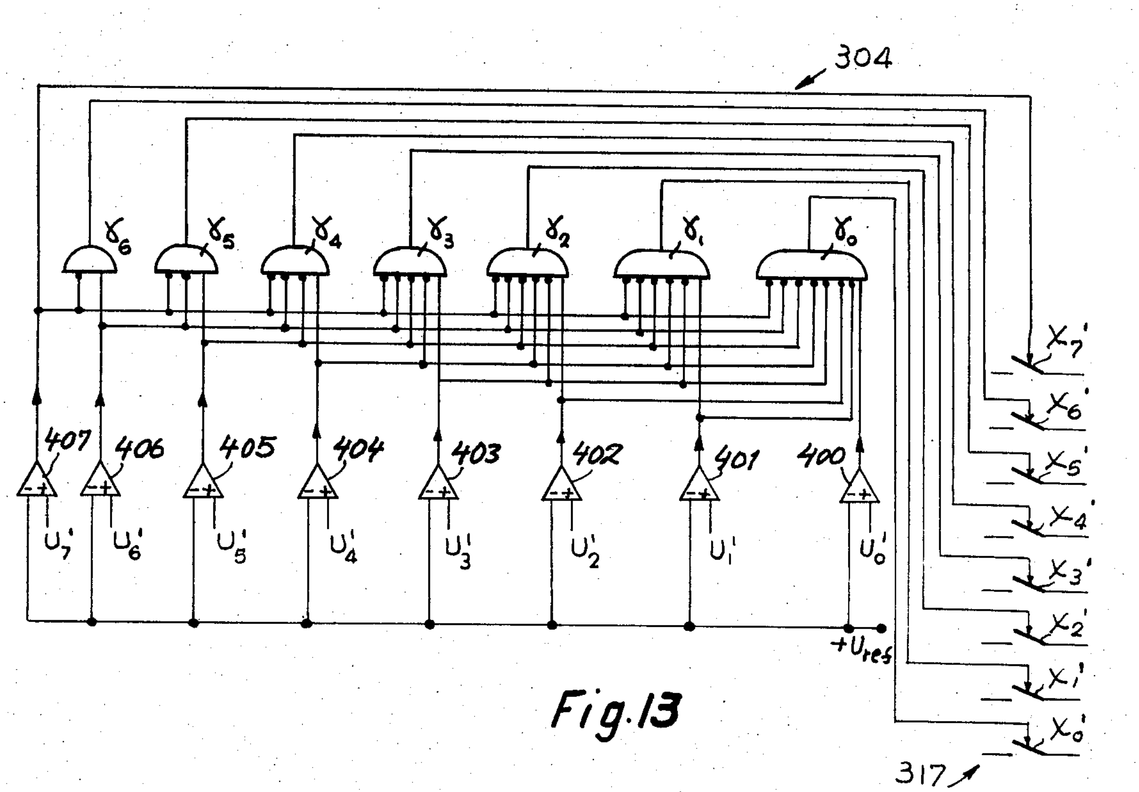
FIG. 13 is a circuit diagram showing part of a decision network in the system of FIG. 12.

In the system of FIG. 12 and 13 I have gone one step beyond the embodiments of FIGS. 7 – 11 by relocating all the operational amplifiers of the amplitude converter into the preamplification stage which has been designated 306' in FIG. 12, the final converter stage 306'' being constituted in this case simply by a selector switch 312. Converter stage 306' comprises 16 amplifiers 390' – 397' and 390'' – 397'', each similar to the amplifier 90 of FIG. 6, having their additive inputs connected in parallel to a common terminal 399 which receives the input signal to be analyzed. A sampler, not shown in FIG. 12, may precede the amplification stage 306' even though it is also possible to insert an individual sampling section in the output of each amplifier in the manner shown in FIG. 7. Since integrated operational amplifiers are commercially available at relatively low cost, the use of a multiplicity of such amplifiers does not create a major economic problem.

Each of these amplifiers is assigned to a respective amplitude band in the first quadrant (units 390' – 397') or in the third quadrant (units 390'' – 397'') in which its operation is linear. Amplifiers 390' and 390'' operating on the lowest positive and negative band, respectively, have fixed weighting resistors $R_s'$ and $R_s''$ whose magnitudes correspond to that of the resistance network $R_1$ – $R_7$ in FIG. 6 with all branches grounded. The next two amplifiers in the array, i.e. unit 391' on the positive and 391'' on the negative side, have their subtractive inputs connected to respective sources of positive and negative biasing voltage $+2U_{ref}$ and $-2U_{ref}$ by way of series resistors $R_1'$ and $R_1''$ equivalent to resistor $R_1$ of FIG. 6; the grounded weighting resistances of these two amplifiers equal the total resistance of branches $R_2$ – $R_6$. For the remaining amplifiers the magnitude of resistances $R_s'$, $R_s''$ progressively increases to infinity for the outermost amplifiers 397' and 397'', i.e. to a condition corresponding to the opening of all switches $Sw_2$ – $Sw_7$ in FIG. 6.

Thus, the sixteen amplifiers of FIG. 12 generate output voltages $U_0'$ – $U_7'$ and $U_0''$ – $U_7''$ which are fed to a decision network 304 ahead of selector 312. Network 304 controls a precoder 305 which generates bits Nos. 1 – 4, as in the system of FIG. 7, and also operates the 16 switches $X_0'$ – $X_7'$ and $X_0''$ – $X_7''$ of selector 312 feeding a final coder 307 for the generation of the last four bits.

Network 304 may include a multiplicity of coincidence gates for selectively passing the output of only the one amplifier which operates in its linear range, one group of these gates being provided for the positive voltages detected by amplifiers 390' - 397' while an identical second group operates on the outputs of the negative-voltage detectors 390'' - 397''. FIG. 13 shows the first group of AND gates, designated $Y_0$ - $Y_6$, whose outputs control the switches $X_0'$ - $X_6'$ whereas switch $X_7'$ is directly controlled by the output lead $U_7'$ of amplifier 397'. Each of these gates has a single noninverting input for the associated amplifier output and one or more inverting inputs receiving the outputs of all higher-order amplifiers of the series, i.e. of amplifier 397' in the case of gate $Y_6$, of amplifiers 397' and 396' in the case of gate $Y_5$, and so forth; between each amplifier 390' - 397' and the associated gate $Y_0$ - $Y_6$ a respective comparator 400 - 407 is inserted for converting the analog signals $U_0'$ - $U_7'$ into digital signals which can be processed by the gates $Y_0$ - $Y_6$. By this lockout circuit the conduction of any amplifier other than unit 390' or 390'' cuts off all the lower-ranking amplifiers on the corresponding (positive or negative) side of the system so that only one of the switches of selector 312 is closed at any time.

It will be apparent that the system of FIGS. 12 and 13 could be modified by placing a zero comparator and rectifying stage as shown in FIG. 4 ahead of the converter stage 306', with a halving of the number of amplifiers and generation of the first bit in the zero comparator rather than in the precoder 305.

It is evident that the number of bits produced by both the precoder and the final coder may be varied, the high degree of sensitivity of my improved system (particularly when using preamplification) enabling the subdivision of each band into more than sixteen amplitude steps to be digitized in, for example, six bits of a 10-bit code word.

I claim:

1. A pulse-code modulator for signal voltages within a predetermined amplitude range divided into at least $2^m$ bands of a width increasing according to a binary law, comprising:

input means for the temporary storage of a signal voltage to be coded;

a decision network connected to receive such signal voltage from said input means for ascertaining the band into which its amplitude falls;

an amplitude converter connected to said input means and controlled by said decision network for multiplying the magnitude of said signal voltage by a factor varying with the location of said band within said range and provided with differential circuitry for reducing the magnitude of said signal voltage by a threshold value representing the lower limit of the respective band, with generation of an output voltage rising linearly from zero within each band;

a precoder controlled by said decision network independently of said converter for identifying the band thus ascertained and translating the identity thereof into a first partial code of *m* bits;

and a final coder directly connected to said converter for translating said output voltage into a second partial code of bits.

2. A modulator as defined in claim 1 wherein said converter comprises operational amplifier means with an additive input terminal, a subtractive input terminal and an output terminal, a voltage divider connected between said output terminal and a point of fixed potential, and a feedback connection from a tap on said voltage divider to said subtractive input terminal, said differential circuitry including a source of biasing voltage for said subtractive input terminal.

3. A modulator as defined in claim 2 wherein said voltage divider includes a fixed resistor between said output and subtractive input terminals and variable-resistance means between said subtractive input and said point of fixed potential, said circuitry comprising switch means controlled by said decision network for alternately connecting a part of said variable-resistance means to said point of fixed potential and to said source of biasing voltage.

4. A modulator as defined in claim 3 wherein said part of said variable-resistance means and said fixed resistors have equal resistance.

5. A modulator as defined in claim 4 wherein said range has an upper limit equaling the value of said biasing voltage, said variable-resistance means comprising $2^m-1$ parallel resistive branches with resistances of $R_0/2^i$ where *i* is an integer ranging from 0 to *m*, $R_0$ being the resistance of said fixed resistor, said part of said variable-resistance means being the electrically least significant one of said branches, said converter further including individual switches in said branches controlled by said decision network, said fixed potential being zero volts.

6. A modulator as defined in claim 5 wherein said decision network comprises $2^m-1$ comparators for matching said signal voltage with respective binary fractions $U_{max}/2^k$ of said biasing voltage $U_{max}$ and for open-circuiting any of said branches, other than the least significant branch of magnitude $R_0$, upon said signal voltage reaching the level of the corresponding binary fraction of said biasing voltage, said switch means being operable by one of said comparators to switch said branch of magnitude $R_0$ from zero volts to said biasing voltage $2U_{ref}$ upon said signal voltage reaching the lowest fraction equal to $U_{max}/(2^m 1)$.

7. A modulator as defined in claim 6 wherein said switch means comprises a pair of transistors of opposite conductivity type alternately saturable by said one of said comparators.

8. A modulator as defined in claim 2 wherein said operational amplifier means comprises at least $2^m$ amplifier units connected in parallel to said input means and biased to cut off at the lower limits of respective bands, said decision network being a logic matrix with input connections to the output terminals of said amplifier units, said converter further including a set of switches controlled by said logic matrix for selectively connecting said output terminals to said final coder.

9. A modulator as defined in claim 2 wherein said converter includes a first amplification stage with a plurality of parallel-connected amplifiers of different amplification ratio, a second amplification stage comprising said operational amplifier means, and switch means between said stages for selectively connecting any one of said parallel-connected amplifiers in tandem with said operational amplifier means under the control of said decision network, the latter having input connections energizable by said first amplification stage.

10. A modulator as defined in claim 9 wherein said converter further includes polarity-inverting means between said amplification stages, said decision network comprising sign-responsive detector means controlling said polarity-inverting means.

11. A modulator as defined in claim 9 wherein said input means comprises a plurality of sampling circuits inserted between said first amplification stage and said switch means, each of said sampling circuits including a storage capacitor connectable by said switch means to said second amplification stage.

12. A modulator as defined in claim 2 wherein said converter further includes polarity-inverting means ahead of said operational amplifier means and sign-responsive detector means connected to said input means ahead of said polarity-inverting means for controlling the latter.

13. A modulator as defined in claim 1 wherein said input means comprises a sampling circuit with a storage capacitor, electronic switch means in a charging path for said capacitor, and ancillary condenser means connected between said switch means and said capacitor for compensating variations in the charge thereof due to switching transients.

14. A modulator as defined in claim 13 wherein said electronic switch means comprises a switching transistor responsive to timing pulses and a field-effect transistor in series with said capacitor, said switching transistor having a collector coupled to a gate electrode of said field-effect transistor and further having an emitter biased through a resistance and connected to said capacitor by way of said ancillary condenser means.

* * * * *